Oct. 12, 1926.
J. J. McELROY
AIR SPRING DEVICE
Filed Sept. 3, 1924     2 Sheets-Sheet 1
1,602,539
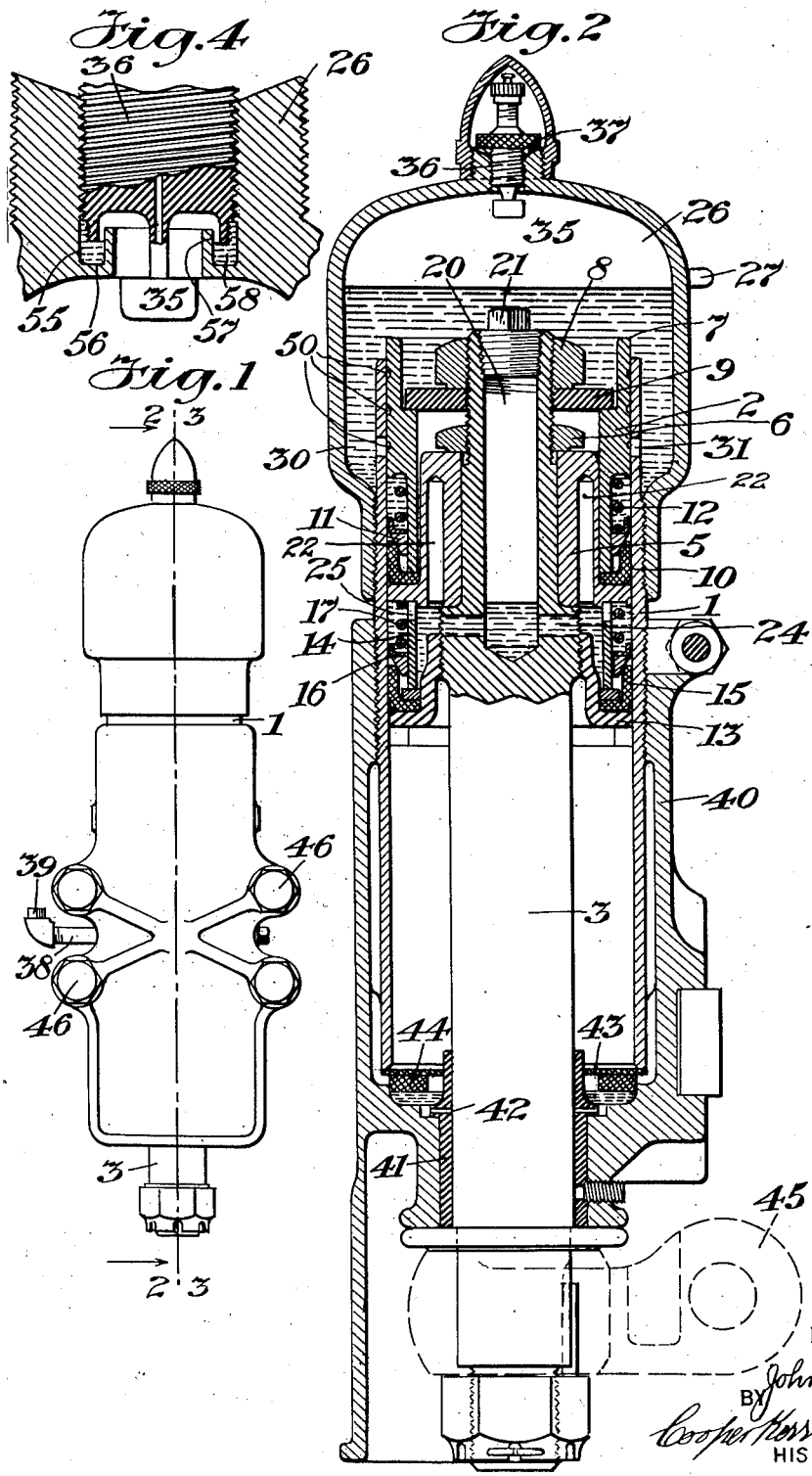
INVENTOR
John J. McElroy
BY
Cooper Kerr & Dunham
HIS ATTORNEYS

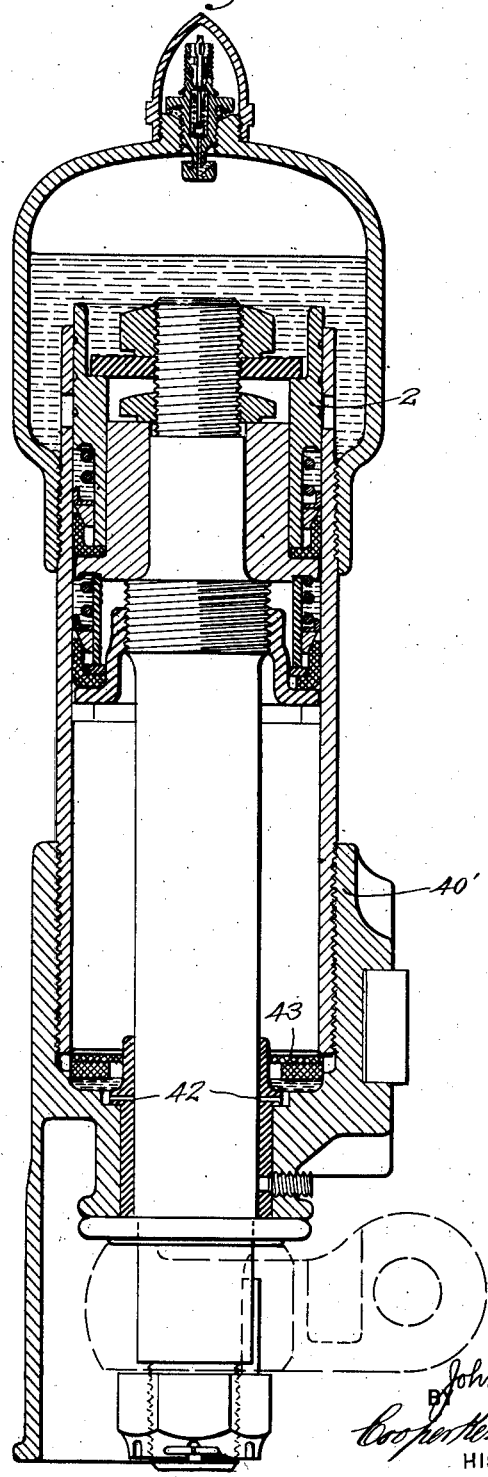

Patented Oct. 12, 1926.

1,602,539

UNITED STATES PATENT OFFICE.

JOHN J. McELROY, OF NEW HAVEN, CONNECTICUT, ASSIGNOR TO THE WESTINGHOUSE AIR SPRING COMPANY, OF NEW HAVEN, CONNECTICUT, A CORPORATION OF PENNSYLVANIA.

AIR-SPRING DEVICE.

Application filed September 3, 1924. Serial No. 735,559.

My present invention relates to method and means for sealing the joints between the parts of the compression chambers of pneumatic springs such as are used for vehicles. It relates particularly to the method and means for producing such seals which comprises forming the elements of the spring structure to provide basins or liquid collecting pockets at the seams or joints of such compression chambers and liquid for such pockets.

In such devices slow or rapid leaks decrease the efficiency thereof, but I have discovered that in cases where increased care in the manufacture and testing of the devices is ineffective in cutting down the numbers of such leaks or is prohibitive in cost that they can be overcome economically by providing the seams of the chambers which are subjected to increased pressure with means for holding sealing liquid thereat.

It is therefore an object of my invention to provide a pneumatic cushion device with a compression chamber all of the seams of which are provided with liquid seals.

It is also an object of my invention to provide an air cushion in which a cylinder and a piston bound a compression chamber and in which oil is used to lubricate the contacting surface of said piston and cylinder with means for trapping oil splashed by said piston and holding it at the seams to provide oil seals thereat.

Other objects of my invention will be apparent from the specification and from the drawings, in which Fig. 1 is an elevational view of an air spring embodying features of my invention.

Fig. 2 is an elevational view in section along the line 2—2 of Fig. 1, showing an air spring with a piston having formed therein pumping means for forcing oil collected between the piston packing rings thereof back into the compression chamber, and with means at the seams of said compression chamber for collecting and holding oil thereat to effect the sealing thereof.

Fig. 3 is an elevational view along the line 3—3 of Fig. 1 of a similar device in which is employed a simple piston.

In Figs. 1 and 2 of the drawings is shown an air spring comprising a cylinder 1 within which works the piston 2 carried by the piston rod 3. Said piston 2 comprises the piston block 5 held on said rod 3 by nut 6. The piston head 7 held by nut 8 and washer 9 on rod 3 holds against block 5 the packing ring 10. The expander 11 serves to hold said ring 10 against the sides of the cylinder and is held in the expanding position by the spring 12, the expander, spring, and ring being positioned beneath the main portion of said head 7 and about a portion thereof of reduced diameter. The piston follower 13 screwed on said rod 3 below said head 7 holds between it and sleeve 14 the second packing ring 15 which is provided with an expander 16 and an expander spring 17. The cavity 20 in rod 3 is closed by plug 21 and the cavities 22, 22 in block 5 connect through openings 24 and 25 with the piston ring cavities and serve to accumulate a head of air by the continued leakage of oil under pressure from the chamber 26 during the action of the air spring sufficient to force oil accumulated in such ring cavities upwardly back into the cushion chamber 26 of the air spring, which occurs when the pressure in the cavities 20, 22, 22 is greater than the lowest pressure in the chamber 26 at the extreme outer stroke of the piston 2.

Said chamber 26 is bounded at its top and part of its sides by the cylinder cap 27 which has a greater maximum diameter than the said cylinder but has a smaller diameter at its lower extremity whereby it is screwed about the outside of said cylinder. The point of attachment of said cap 27 to the cylinder is considerably below the upper extremity of the cylinder, whereby is formed an annular pocket 30 at the seam of their juncture in which oil splashed by the piston collects to form a seal for said seam. Holes 31, 31 in said cylinder at an appreciable distance above said seam serve to allow excess oil to flow back and forth into the cylinder.

The cup 35 depending from the body 36 of air valve 37 and communicating with the main bore thereof (see Fig. 3) serves to hold a charge of oil which upon any leakage of said valve 37 will be drawn up into the valve and effectually seal it at its seat to prevent further leakage. A charge of oil in said cup 35 is maintained therein by being replenished through the splashing of oil thereinto by said piston during its action.

The cylinder is mounted by being screwed into the cup member 40 at a point above its lower end, the bottom of said cup serving as a guide for piston rod 3 which passes through it. Lubricating oil is fed to the lower part of the cylinder through pipe 38, which is provided with a suitable closure as plug 39, or just a loose flat cover to keep dust and dirt out. The chamber formed by said cup member 40 and the piston and cylinder serves when said pipe 38 is closed tightly as by said plug 39 as a rebound compression chamber for taking care of the reaction from the main compression chamber. The bearing bushing 41 mounted in said bottom provides proper bearing surface for said rod. The bushing is drilled at 42 near the bottom of the interior of cup 40 to allow oil to flow to lubricate the rod and bushing. The felt washer 43 serves to hold oil which will flow for such lubrication and the rubber washer 44 serves as a bumper for the bottom of the piston 2 during extreme movement thereof. The shackle 45 serves to connect the piston rod to a steel spring of a vehicle and the bolts 46, 46 serve to mount the cylinder to the chassis thereof.

In Fig. 3 is shown a device similar to that of Fig. 2 but having a piston without pump chambers and with the cylinder mounted at its end to the cup 40'.

In the use and operation of the device of my invention chamber 26 is provided with sufficient oil to seal pocket 30, to seal the valve as described, and when the piston is in the down position to cover the head thereof in the cylinder and thereby seal the joint therebetween. In the extreme up position, as shown in the drawings, the oil will extend over the ends of the cylinder by being displaced by the piston or will flow through holes 31 into the annular oil channels 50 formed in head 7 to thereby effect a liquid seal between the piston and cylinder.

In Fig. 4 is shown an oil seal between the valve housing 37 and the cap dome 26 comprising the skirt 55 on said housing which depends into the annular channel 56 bounded by rim 57 which is formed in the inside of the housing receiving opening in said cap. Oil 58 splashed by the piston serves as the seal between the cap and the housing.

I claim—

1. An air spring device comprising a cylinder, a cap joined to said cylinder, a piston in said cylinder, an air valve for the chamber formed by said members, and an oil seal for the cylinder and cap joint, for the cylinder and piston sliding joint, and for the air valve.

2. An air spring device comprising a cylinder, a cap joined to said cylinder, a piston in said cylinder, an oil seal for the cylinder and cap joint and for the cylinder and piston sliding joint, and a pump for returning escaped fluid through the piston seal to the chamber above the piston.

3. An air spring device comprising a cylinder, a cap joined to said cylinder, a piston in said cylinder, a pump for returning escaped fluid to the chamber above the piston, an oil seal for the cylinder and cap joint and for the cylinder and piston sliding joint, and an air valve for the said chamber and an oil seal for said air valve.

4. An air spring device comprising a cylinder, a cap joined to said cylinder, a piston in said cylinder, an air valve for the chamber formed by said members, and an oil seal for the cylinder and cap joint, for the cylinder and piston sliding joint, for the valve housing and cap joint, and for the air valve.

In testimony whereof I hereto affix my signature.

JOHN J. McELROY.